(12) United States Patent
Nakahara

(10) Patent No.: US 8,483,022 B2
(45) Date of Patent: Jul. 9, 2013

(54) OPTICAL HEAD DEVICE AND OPTICAL DISC APPARATUS

(75) Inventor: Hironori Nakahara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 136 days.

(21) Appl. No.: 13/056,123

(22) PCT Filed: Jul. 10, 2009

(86) PCT No.: PCT/JP2009/003234
§ 371 (c)(1),
(2), (4) Date: Jan. 27, 2011

(87) PCT Pub. No.: WO2010/018653
PCT Pub. Date: Feb. 18, 2010

(65) Prior Publication Data
US 2011/0128832 A1    Jun. 2, 2011

(30) Foreign Application Priority Data

Aug. 11, 2008 (JP) .................. 2008-206717
May 15, 2009 (JP) .................. 2009-118752

(51) Int. Cl.
*G11B 7/00* (2006.01)

(52) U.S. Cl.
USPC .............. 369/44.11; 369/112.11; 369/112.15

(58) Field of Classification Search
USPC ............... 369/44.11, 112.03, 112.11, 112.15
See application file for complete search history.

(56) References Cited

U.S. PATENT DOCUMENTS

| 7,227,819 | B2 * | 6/2007 | Kadowaki et al. ......... 369/44.41 |
| 7,280,458 | B2 | 10/2007 | Lee et al. |
| 2002/0009023 | A1 | 1/2002 | Nishiwaki et al. |
| 2002/0159378 | A1 | 10/2002 | Lee et al. |
| 2004/0228236 | A1 * | 11/2004 | Sakai et al. ................ 369/44.41 |

(Continued)

FOREIGN PATENT DOCUMENTS

| EP | 1391884 A2 | 2/2004 |
| EP | 1575038 A1 | 9/2005 |

(Continued)

*Primary Examiner* — Wayne Young
*Assistant Examiner* — Brenda Bernardi
(74) *Attorney, Agent, or Firm* — Birch, Stewart, Kolasch & Birch, LLP.

(57) ABSTRACT

An optical head device and an optical disc apparatus of a simple structure capable of canceling an offset in a tracking error signal caused when an objective lens shifts; in the optical head device, a polarizing hologram 104 has first diffraction areas 112 and 113 including a whole of an area irradiated with overlap of a zeroth-order beam of reflection light from an optical disc 1 and positive/negative first-order beams of the reflection light, and a second diffraction area 111 including an area irradiated with the zeroth-order beam of the reflection light and not irradiated with the positive/negative first-order beams of the reflection light without including the first diffraction area; and a photodetector 109 has a first light receiving section 131 for receiving a first light beam which is a zeroth-order beam of diffraction light generated by the polarizing hologram 104, a second light receiving section for receiving a second light beam which is a positive first-order beam of the diffraction light generated by the second diffraction area, and a third light receiving section for receiving a third light beam which is a negative first-order beam of the diffraction light generated by the second diffraction area.

11 Claims, 16 Drawing Sheets

U.S. PATENT DOCUMENTS

| | | |
|---|---|---|
| 2007/0189130 A1 | 8/2007 | Anzai et al. |
| 2007/0297731 A1 | 12/2007 | Horiyama |
| 2008/0219119 A1 | 9/2008 | Izumi et al. |
| 2010/0177619 A1 | 7/2010 | Sato et al. |

FOREIGN PATENT DOCUMENTS

| | | |
|---|---|---|
| JP | 8-63778 A | 3/1996 |
| JP | 9-223321 A | 8/1997 |
| JP | 2001-266369 A | 9/2001 |
| JP | 2002-83433 A | 3/2002 |
| JP | 2002-358668 A | 12/2002 |
| JP | 2006-331475 A | 12/2006 |
| JP | 2008-027565 A | 2/2008 |
| JP | 2008-226293 A | 9/2008 |
| JP | 2009-9628 A | 1/2009 |
| WO | WO 2008/041330 A1 | 4/2008 |

* cited by examiner

FIG. 3
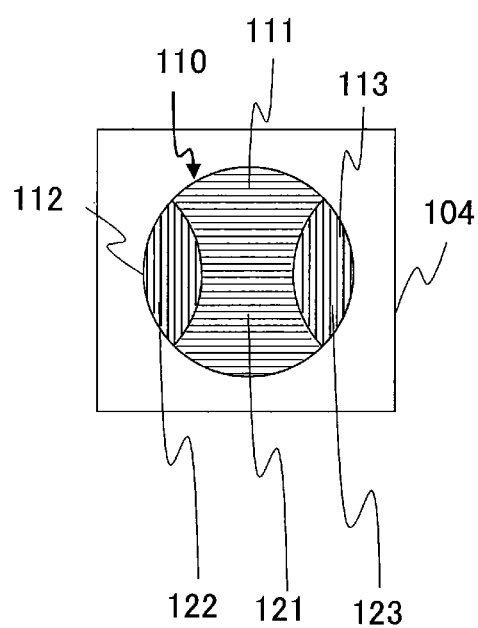
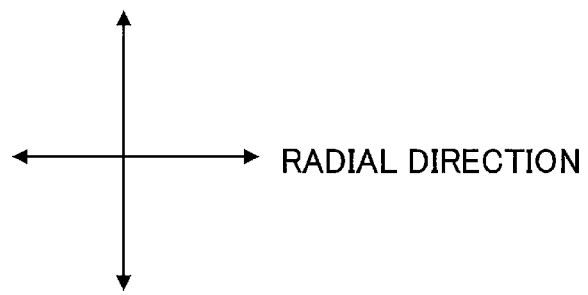

FIG. 4
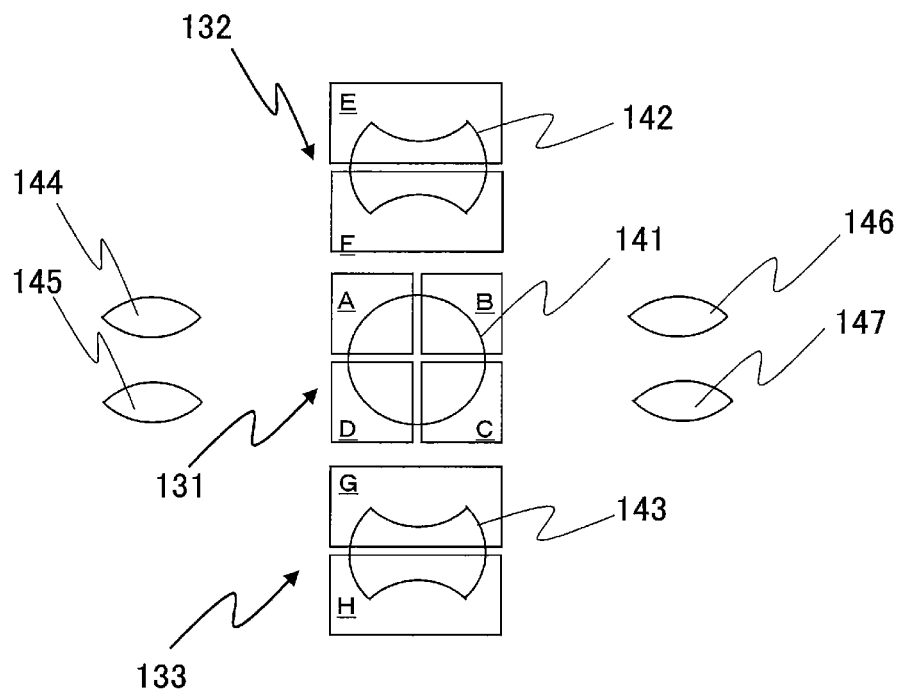
DIRECTION CORRESPONDING TO
RADIAL DIRECTION
DIRECTION CORRESPONDING TO
TANGENTIAL DIRECTION

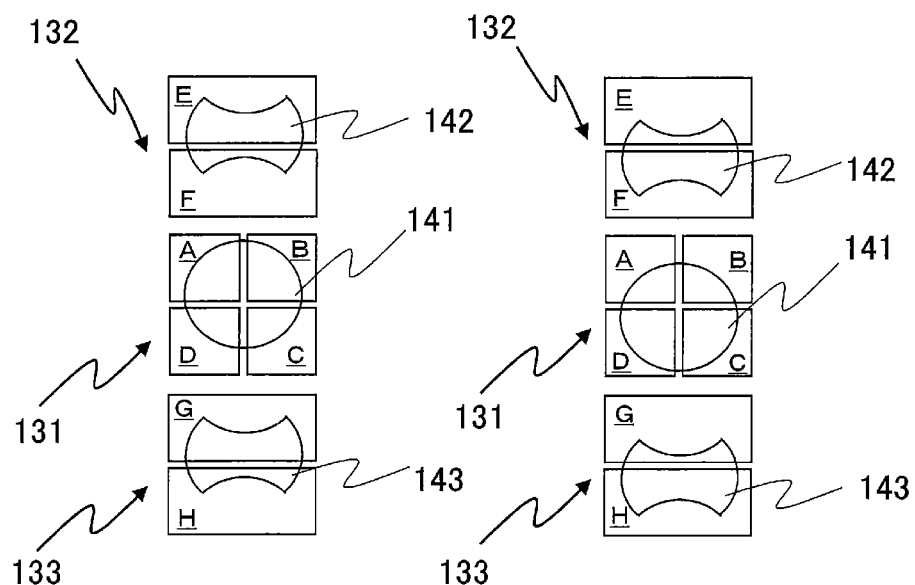

FIG. 8
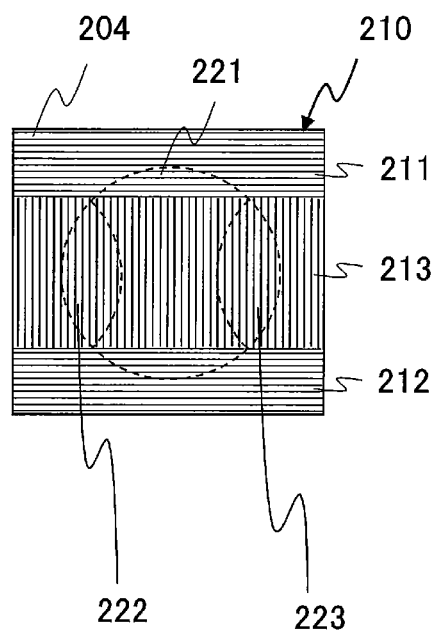
TANGENTIAL DIRECTION
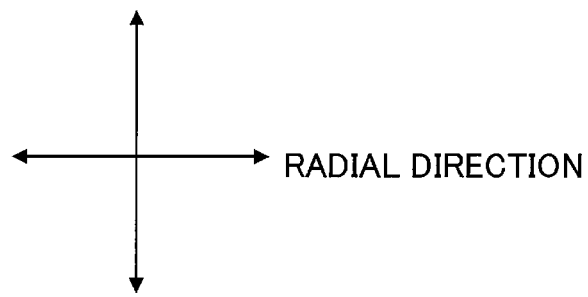
RADIAL DIRECTION

FIG. 9
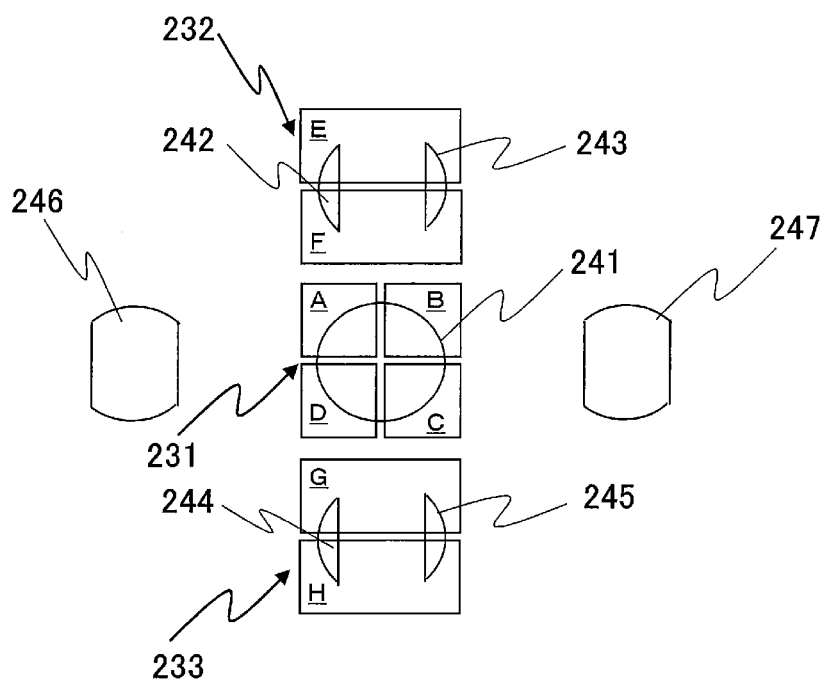
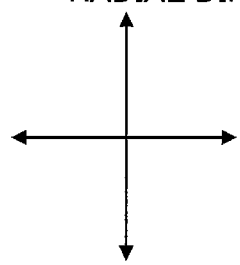
DIRECTION CORRESPONDING TO RADIAL DIRECTION
DIRECTION CORRESPONDING TO TANGENTIAL DIRECTION

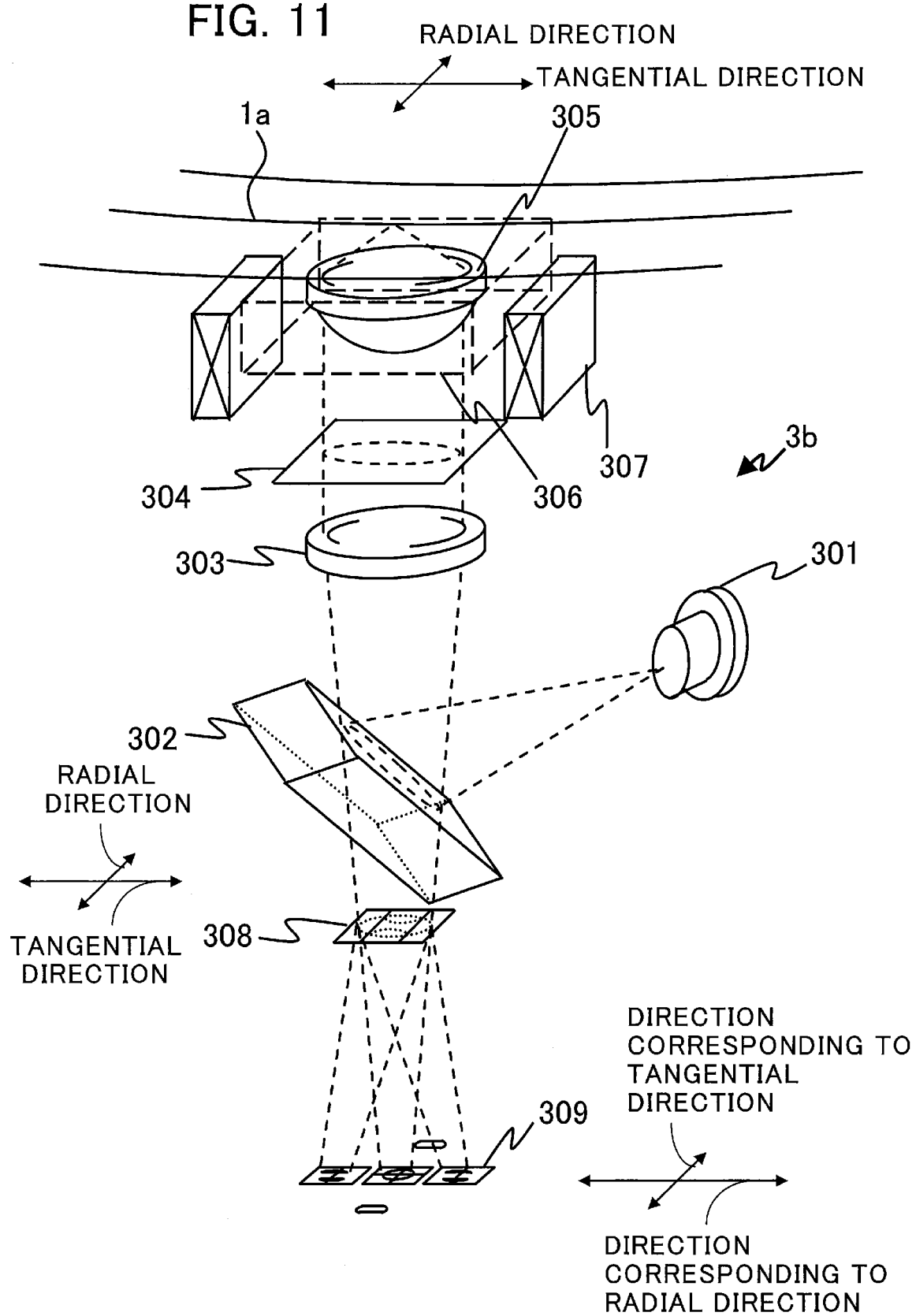

FIG. 12
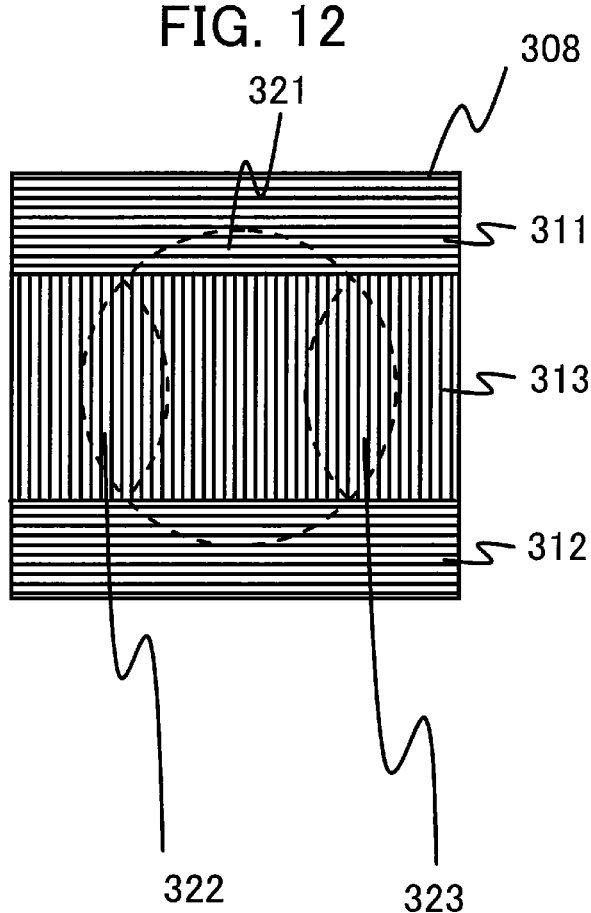
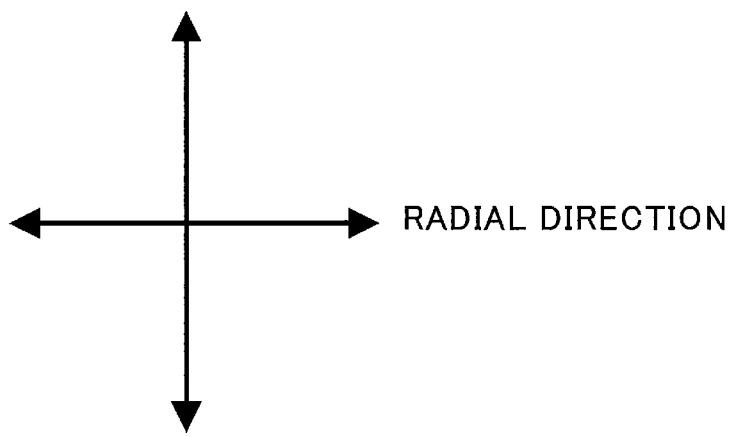

DIRECTION CORRESPONDING TO RADIAL DIRECTION

DIRECTION CORRESPONDING TO TANGENTIAL DIRECTION

FIG. 14A  FIG. 14B
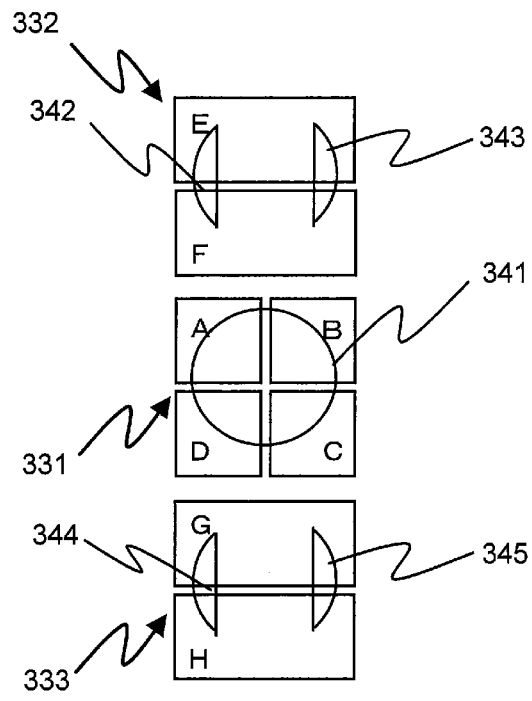
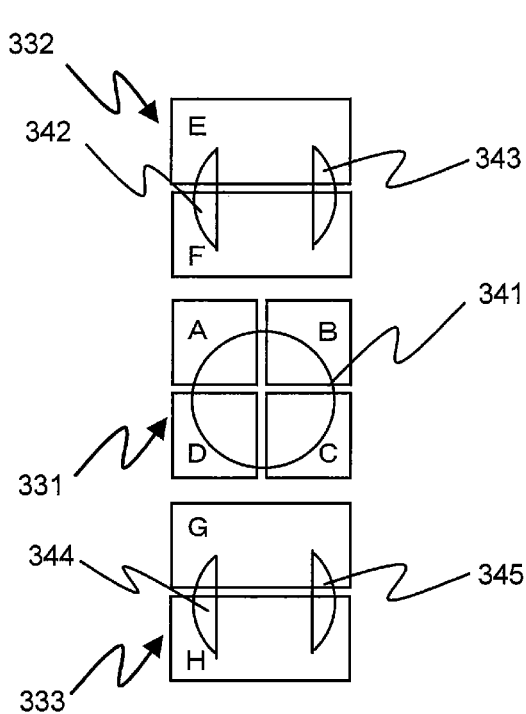
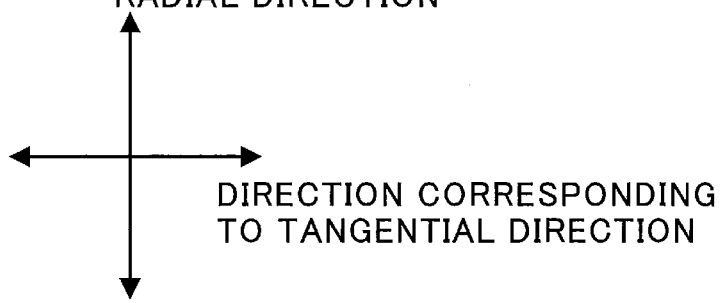

FIG. 15
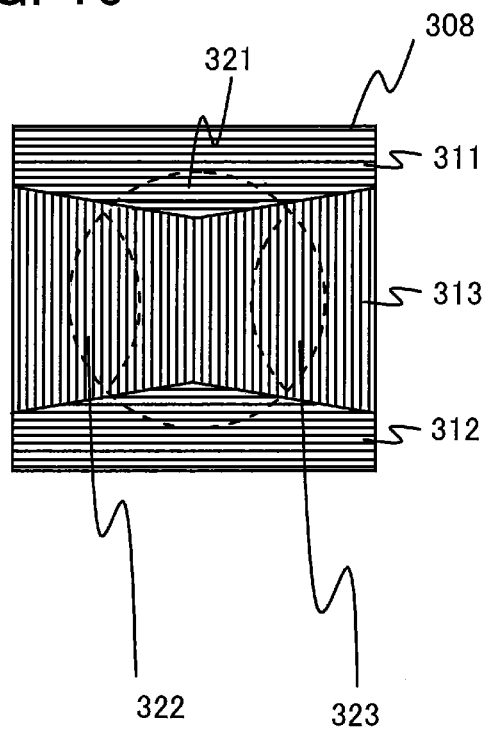
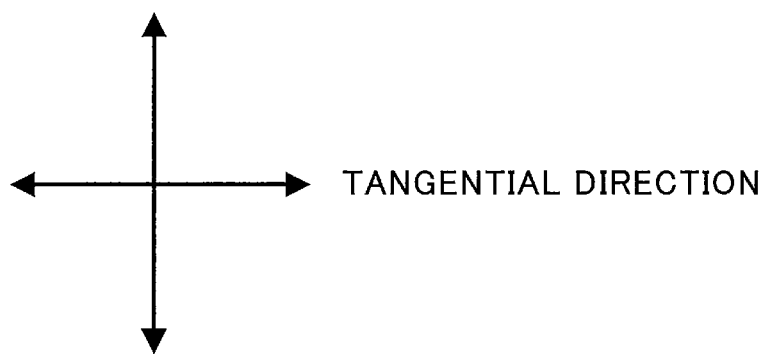

OPTICAL HEAD DEVICE AND OPTICAL DISC APPARATUS

FIELD OF THE INVENTION

The present invention relates to an optical head device and an optical disc apparatus having the same.

BACKGROUND ART

A one-beam push-pull method is known as a method of making laser light from an optical head device follow an information track on an optical disc. In this method, reflection light of the laser light which has been diffracted at an information track on the optical disc is detected by two-divided light receiving surfaces of a photodetector, and an objective lens is shifted in a radial direction of the optical disc so that a tracking error signal which is a difference between detection signals approaches zero.

However, in the conventional one-beam push-pull method, if the objective lens shifts in the radial direction of the optical disc, a positional relationship between the objective lens and the photodetector relatively changes. Consequently, a light spot applied on the photodetector shifts and an offset occurs in the tracking error signal.

An art of canceling an offset is proposed in Patent Document 1, for example. According to the art described in the Patent Document 1, positive/negative first-order diffraction light from a polarizing hologram is separated, each of the separated positive/negative first-order diffraction light is detected by a photodetector which has a light receiving surface larger than a shift amount of an irradiation position, and a tracking error signal without offset is obtained by using a detection signal resulting from the detection.

SUMMARY OF THE INVENTION

Problems to be Solved by the Invention

However, an optical pickup described in the Patent Document 1 has the following problem that: the optical pickup requires a special photodetector in order to cancel an offset in a tracking error signal according to the one-beam push-pull method when the objective lens shifts and thereby a structure is complicated.

Thus, the present invention is made to solve the problem of the conventional art, and an object of the present invention is to provide an optical head device and an optical disc apparatus of a simple structure capable of canceling an offset in a tracking error signal occurring when an objective lens shifts.

Means of Solution of the Problems

An optical head device of the present invention includes: a laser light source for emitting laser light; an objective lens for collecting the laser light which travels toward an optical disc and collecting reflection light which has been diffracted by an information track on the optical disc; a diffraction element for diffracting the reflection light which is collected by the objective lens; an optical element for providing the reflection light with astigmatism; a photodetector for receiving the reflection light; and an objective lens actuator for receiving a drive signal from an external device and shifting the objective lens, in an amount corresponding to a value of the drive signal, at least in a radial direction of the optical disc. The diffraction element includes: a first diffraction area including a whole of an area which is irradiated with overlap of a zeroth-order beam of the reflection light and positive/negative first-order beams of the reflection light; and a second diffraction area including an area which is irradiated with the zeroth-order beam of the reflection light and not irradiated with the positive/negative first-order beams of the reflection light and without including the first diffraction area. The photodetector includes: a first light receiving section including a plurality of light receiving surfaces for receiving a first light beam which is the zeroth-order beam of the diffraction light generated by the first diffraction area and the second diffraction area, the plurality of light receiving surfaces being adjacently arranged at least in the direction corresponding to the radial direction; and at least one of a second light receiving section and a third light receiving section, the second light receiving section including a plurality of light receiving surfaces for receiving a second light beam which is a positive first-order beam of the diffraction light generated by the second diffraction area and the plurality of light receiving surfaces being adjacently arranged in the direction corresponding to the radial direction, the third light receiving section including a plurality of light receiving surfaces for receiving a third light beam which is a negative first-order beam of the diffraction light generated by the second diffraction area and the plurality of light receiving surfaces being adjacently arranged in the direction corresponding to the radial direction.

Effect of the Invention

According to an aspect of the present invention, there is an advantageous effect that an offset in a tracking error signal occurring when the objective lens shifts can be canceled, by only modifying shapes of the first diffraction area and the second diffraction area in the diffraction element.

BRIEF DESCRIPTION OF THE DRAWINGS

FIG. 3 is a plan view illustrating a polarizing hologram in FIG. 2.

FIG. 4 is a diagram illustrating light receiving surfaces of a photodetector in FIG. 2 and areas irradiated with seven light beams which are divided by the polarizing hologram.

FIGS. 5A and 5B are diagrams illustrating shifted irradiation positions irradiated with the light beams on the light receiving surfaces of the photodetector, as a result of shifts of the objective lens in a radial direction.

FIG. 8 is a plan view illustrating a polarizing hologram in FIG. 7.

FIG. 9 is a diagram illustrating light receiving surfaces of a photodetector in FIG. 7 and areas irradiated with seven light beams which are divided by the polarizing hologram.

FIG. 11 is a perspective view schematically illustrating a structure of an optical head device according to the third embodiment.

FIG. 12 is a plan view illustrating a hologram in FIG. 11.

FIGS. 14A and 14B are diagrams illustrating shifted irradiation positions irradiated with the light beams on the light receiving surfaces of the photodetector, as a result of shifts of an objective lens in a radial direction.

FIG. 15 is a plan view illustrating another example of the hologram in FIG. 11.

MODE FOR CARRYING OUT THE INVENTION

First Embodiment

Figure 1:
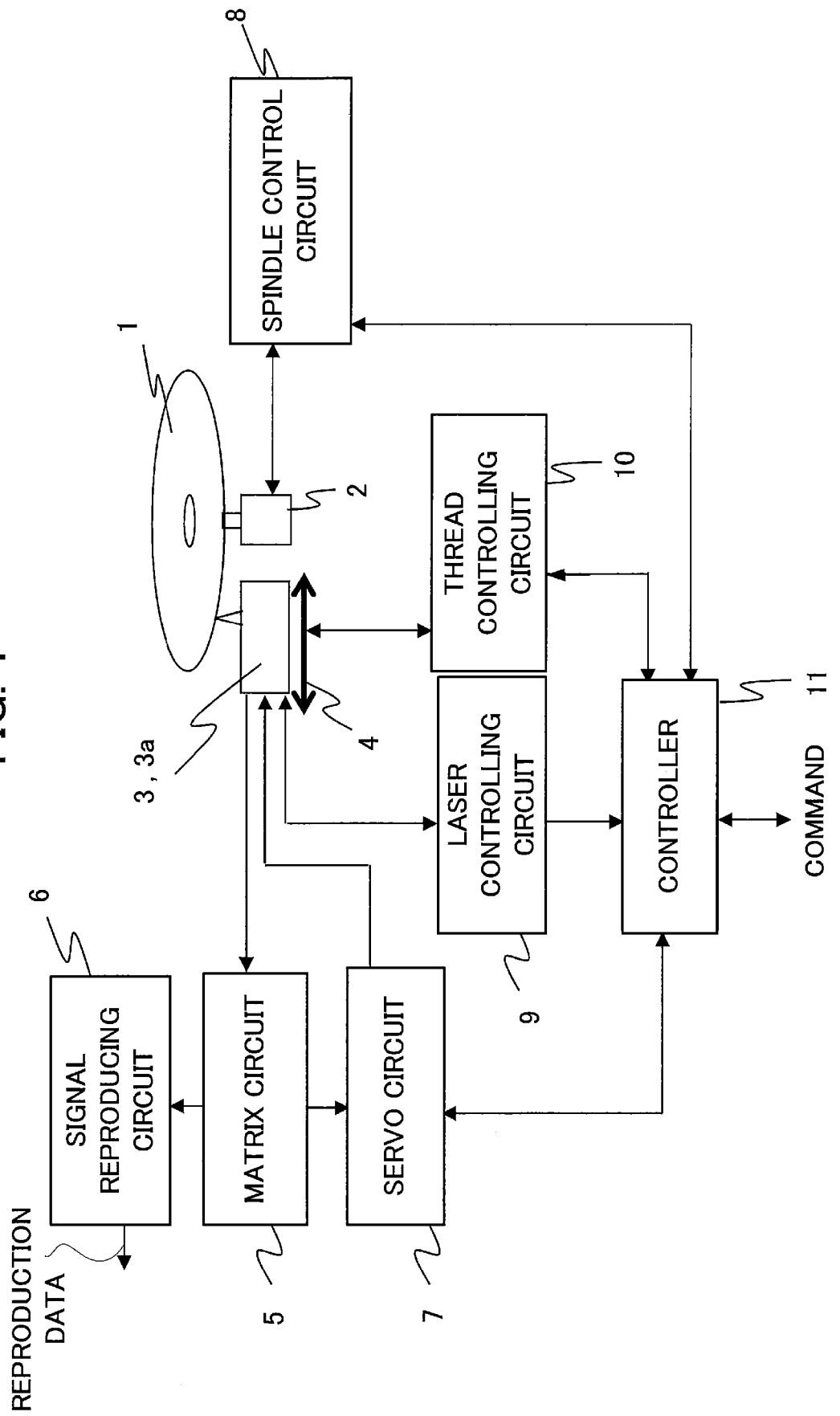
FIG. 1 is a diagram schematically illustrating a structure of an optical disc apparatus according to first, second and third embodiments of the present invention.

FIG. 1 is a diagram schematically illustrating a structure of an optical disc apparatus according to a first embodiment of the present invention. As illustrated in FIG. 1, the optical disc apparatus has a turntable (not illustrated in the drawing) onto which an optical disc 1 is mounted; a spindle motor 2 which is a disc driving unit for rotating and driving the turntable when recording or playback is performed; an optical head device 3 which reads out data from or writes data on the optical disc 1; and a shifting means 4 which shifts the optical head device 3 in a radial (radius) direction of the optical disc. The optical disc apparatus has a matrix circuit 5 which receives an electrical signal corresponding to a receiving light amount of a light beam detected by light receiving surfaces (light receiving elements) of a photodetector (illustrated in FIG. 2 which will be described below) of the optical head device 3; a signal reproducing circuit 6; a servo circuit 7; a spindle controlling circuit 8; a laser controlling circuit 9; a thread controlling circuit 10; and a controller 11.

The matrix circuit 5, which has a matrix operation circuit, an amplifying circuit and the like, produces necessary signals, such as a reproduction signal of a high-frequency signal, a focus error signal and a tracking error signal for servo control, by performing matrix operation on output signals from the plurality of light receiving surfaces of the photodetector of the optical head device 3. The reproduction signal outputted from the matrix circuit 5 is supplied to the signal reproducing circuit 6, and the focus error signal and the tracking error signal are supplied to the servo circuit 7.

The signal reproducing circuit 6 performs binarization, reproduction clock generation and other processing on the reproduction signal from the matrix circuit 5 and produces reproduction data. The reproduction data produced by decoding is transferred to a host device, which is not illustrated in the drawing, such as a device as an AV system, a personal computer or other devices.

The servo circuit 7 produces a focus servo drive signal and a tracking servo drive signal on the basis of the focus error signal and the tracking error signal supplied from the matrix circuit 5, and the servo circuit 7 causes the optical head device 3 to perform servo operation. That is, a focus drive signal and a tracking drive signal are produced corresponding to the focus error signal and the tracking error signal, and a focus coil and a tracking coil of an objective lens actuator in the optical head device 3 are driven. Thus, a focus servo loop and a tracking servo loop are formed by the optical head device 3, the matrix circuit 5, and the servo circuit 7.

The spindle controlling circuit 8 controls rotation of the spindle motor 2. The laser controlling circuit 9 controls intensity of laser light emitted from the optical head device 3. The thread controlling circuit 10 enables the optical head device 3 to shift in the radial direction of the optical disc 1 by the shifting means 4 and enables the optical head device 3 to read out from a desired position in the radial direction on the optical disc 1.

The various operations in a servo system and a reproduction system described above are controlled by the controller 11 which is formed by a micro computer. The controller 11 performs various operations in response to commands from the host device.

Figure 2:
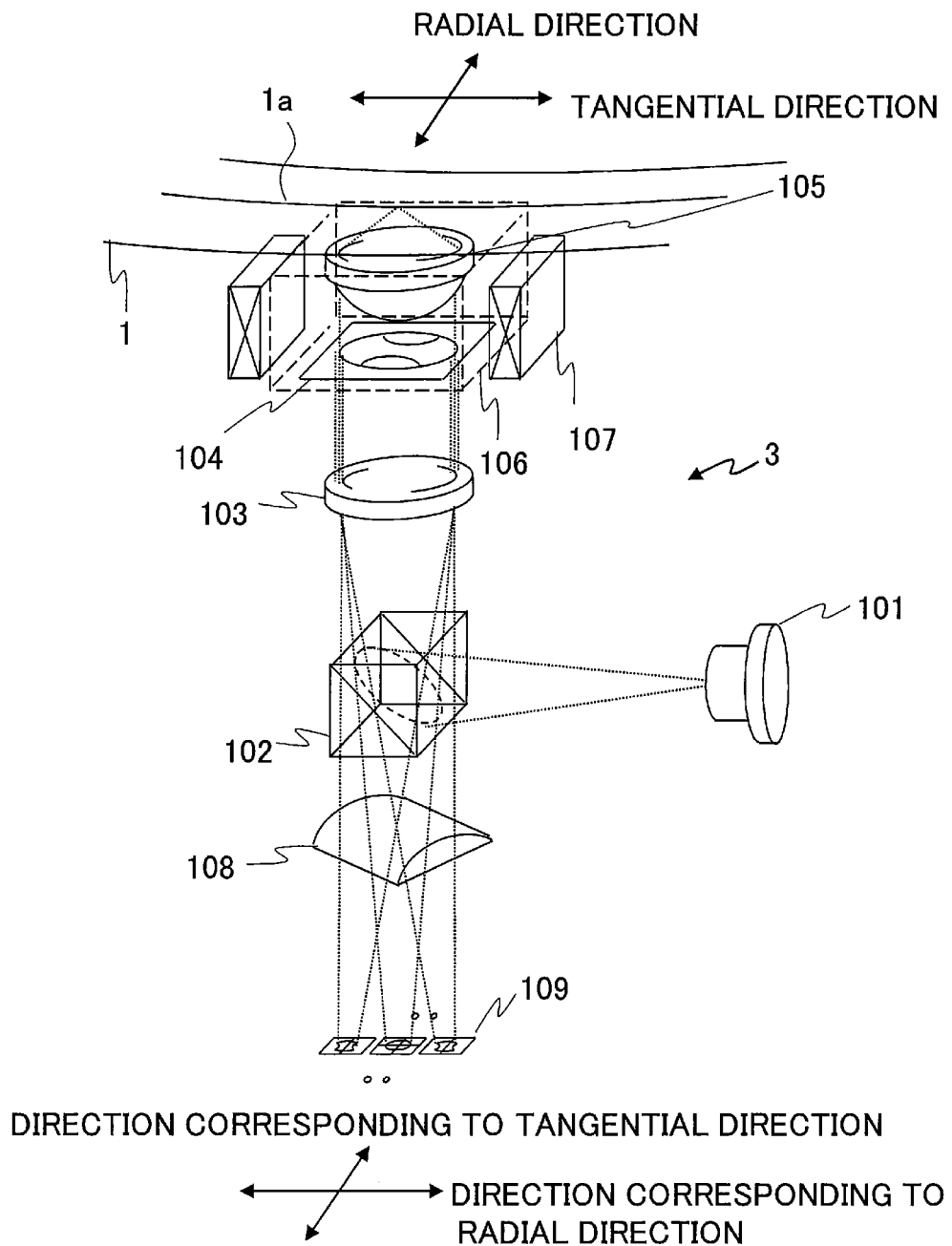
FIG. 2 is a perspective view schematically illustrating a structure of an optical head device according to the first embodiment.

FIG. 2 is a perspective view schematically illustrating a structure of the optical head device 3 according to the first embodiment. As illustrated in FIG. 2, the optical head device 3 has a semiconductor laser 101 which is a laser light source for emitting laser light; a polarizing beam splitter 102; a collimator lens 103; a polarizing hologram 104 which is a diffraction element; a ¼ wavelength plate (which is laminated on the polarizing hologram 104 and not illustrated in the drawing); an objective lens 105 which collects the laser light travelling to the optical disc 1 and reflection light diffracted by an information track 1a of the optical disc 1; a movable holder unit 106 which holds the objective lens 105 and the polarizing hologram 104 as a single body; the objective lens actuator 107 which drives the movable holder unit 106 in a focus direction or the radial direction on the optical disc 1; a cylindrical lens 108 which is an optical element for providing astigmatism; and the photodetector 109. The laser light emitted from the semiconductor laser 101 changes its direction by the polarizing beam splitter 102, travels through the collimator lens 103, the polarizing hologram 104 and the ¼ wavelength plate (not illustrated in the drawing), and then is collected on the information track 1a on the optical disc 1 by the objective lens 105. The laser light is diffracted by the information track 1a and thus reflection light is generated. The reflection light travels through the objective lens 105 and the ¼ wavelength plate (not illustrated in the drawing), and is divided by the polarizing hologram 104 into a plurality of light beams (seven light beams in the first embodiment). The plurality of light beams travel through the polarizing beam splitter 102, are provided with astigmatism by the cylindrical lens 108, and then reach the photodetector 109.

FIG. 3 is a plan view illustrating the polarizing hologram 104 in FIG. 2. The polarizing hologram 104 has first diffraction areas 112 and 113 including a whole of areas which are irradiated with overlap of a zeroth-order beam of the reflection light diffracted by the information track 1a on the optical disc and positive/negative first-order beams of the reflection light. The polarizing hologram 104 has a second diffraction area 111 including an area which is irradiated with the zeroth-order beam of the reflection light and not irradiated with the positive/negative first-order beams of the reflection light and without including the first diffraction areas 112 and 113. As illustrated in FIG. 3, in the first embodiment, the first diffraction areas 112 and 113 have same shapes as two areas 122 and 123 (vertically-hatched areas in FIG. 3) which are irradiated with overlap of the zeroth-order beam of the reflection light and the positive/negative first-order beams of the reflection light on the polarizing hologram 104. As illustrated in FIG. 3, in the first embodiment, the second diffraction area 111 has a same shape as an area 121 (a horizontally-hatched area in FIG. 3) which is irradiated with the zeroth-order beam of the reflection light and not irradiated with the positive/negative first-order beams of the reflection light on the polarizing hologram 104. More detailed explanation is as follows: the polarizing hologram 104 is formed by the three diffraction areas 111, 112 and 113, as illustrated in FIG. 3, and an effective circle 110 of the polarizing hologram 104 formed by the three diffraction areas 111, 112 and 113 has a diameter which is set to be equal to an effective diameter of the objective lens 105. The objective lens 105 and the polarizing hologram 104 are fixed to the movable holder unit 106 so that an optical axis of the objective lens 105 agrees with a center of the effective circle 110. On the basis of that laser light has various polarization directions, the polarizing hologram 104 diffracts only the returning laser light reflected by the optical disc 1 and splits the returning laser light into a plurality of diffraction light (seven light beams of the zeroth-order beam and the positive/negative first-order beams, in the first embodiment). A light amount ratio of the split diffraction light is as follows:

positive first-order beam:zeroth-order beam:negative first-order beam=1:1:1.

FIG. 4 is a diagram illustrating light receiving surfaces of the photodetector 109 in FIG. 2 and areas irradiated with the light which is split into the seven beams by the polarizing hologram 104. The photodetector 109 has a first light receiving section 131 which includes a plurality of light receiving surfaces for receiving a first light beam 141 which is a zeroth-order beam of the diffraction light generated by the first diffraction areas 112 and 113 and the second diffraction area 111 of the polarizing hologram 104 (i.e., a zeroth-order beam generated as a result of diffraction (transmission) of the reflection light from the optical disc 1 by the polarizing hologram 104), and the plurality of light receiving surfaces are adjacently arranged at least in a direction corresponding to a radial direction. The photodetector 109 has a second light receiving section 132 which includes a plurality of light receiving surfaces for receiving a second light beam 142 which is a positive first-order beam of diffraction light generated by the second diffraction area 111 of the polarizing hologram 104, and the plurality of light receiving surfaces are adjacently arranged in the direction corresponding to the radial direction. The photodetector 109 has a third light receiving section 133 which includes a plurality of light receiving surfaces for receiving a third light beam 143 which is a negative first-order beam of the diffraction light generated by the second diffraction area 111, and the plurality of light receiving surfaces are adjacently arranged in the direction corresponding to the radial direction. In the first embodiment, the light receiving surfaces of the photodetector 109 form an eight-divided photodetector for tracking error detection according to a differential method which is typical as a tracking error signal generating method for optical disc apparatuses. The photodetector 109 has the eight light receiving surfaces: four light receiving surfaces A, B, C and D forming the first light receiving section 131; two light receiving surfaces E and F forming the second light receiving section 132; and two light receiving surfaces G and H forming the third light receiving section 133. The four light receiving surfaces A, B, C and D of the first light receiving section 131 are adjacently arranged in the directions corresponding to the radial direction and a tangential direction (a tangential direction in a light beam irradiation position on the information track 1*a*) of the optical disc 1. The two light receiving surfaces E and F of the second light receiving section 132 are adjacently arranged in the direction corresponding to the radial direction of the optical disc 1. The two light receiving surfaces G and H of the third light receiving section 133 are adjacently arranged in the direction corresponding to the radial direction of the optical disc 1. A boundary line between the two light receiving surfaces E and F of the second light receiving section 132 is a straight line extending in the direction corresponding to the tangential direction, and a boundary line between the two light receiving surfaces G and H of the third light receiving section 133 is a straight line extending in the direction corresponding to the tangential direction.

The first light beam 141 which is the zeroth-order laser beam generated by the polarizing hologram 104 (passing through the polarizing hologram 104) reaches the light receiving surfaces A, B, C and D of the first light receiving section 131. The second light beam 142 which is the positive first-order beam of the diffraction light generated by the second diffraction area 111 of the polarizing hologram 104 reaches the light receiving surfaces E and F of the second light receiving section 132. The third light beam 143 which is the negative first-order beam of the diffraction light generated by the diffraction area 111 of the polarizing hologram 104 reaches the light receiving surfaces G and H of the third light receiving section 133. The positive/negative first-order beams diffracted by the first diffraction areas 112 and 113 of the polarizing hologram 104 reach outside the light receiving surfaces of the photodetector 109, as laser beams 144, 145, 146 and 147. In the following explanation, levels of electric signals which are photo-electrically converted by the light receiving surfaces A, B, C, D, E, F, G and H are denoted by A, B, C, D, E, F, G and H, respectively.

The matrix circuit 5 receives detection signals A, B, C, D, E, F, G and H of the photodetector 109 and produces a focus error signal FES according to an astigmatic operation of the following equation:

$$FES=(A+C)-(B+D)$$

The matrix circuit 5 produces a tracking error signal TES according to an operation of the following equation:

$$TES=(A+B)-(D+C)-k\times\{(E-F)+(G-H)\}$$

where k is a constant.

FIGS. 5A and 5B are diagrams illustrating shifted irradiation positions irradiated with the light beams on the light receiving surfaces of the photodetector 109, as a result of shifts of the objective lens 105 in the radial direction. FIG. 5A illustrates that the first to third light beams 141, 142 and 143 shift toward an upper part of FIG. 5A, when the objective lens 105 shifts in an internal circumferential direction of the optical disc 1. FIG. 5B illustrates that the first to third light beams 141, 142 and 143 shift toward a lower part of FIG. 5B, when the objective lens 105 shifts in an external circumferential direction of the optical disc 1.

Figure 6A:
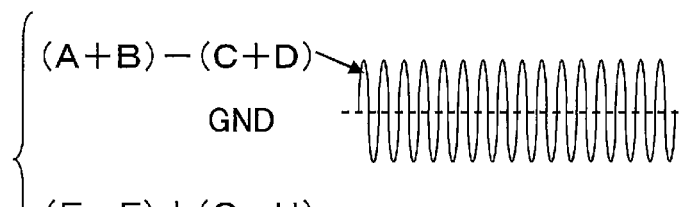
FIGS. 6A to 6C are diagrams illustrating changes in detection signals from the light receiving surfaces of the photodetector, as a result of the shifts of the objective lens in the radial direction.
Figure 6B:
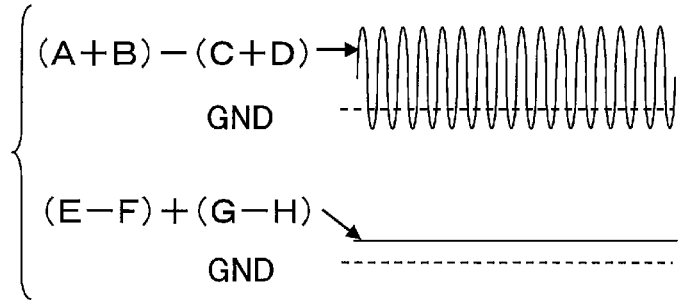
Figure 6C:
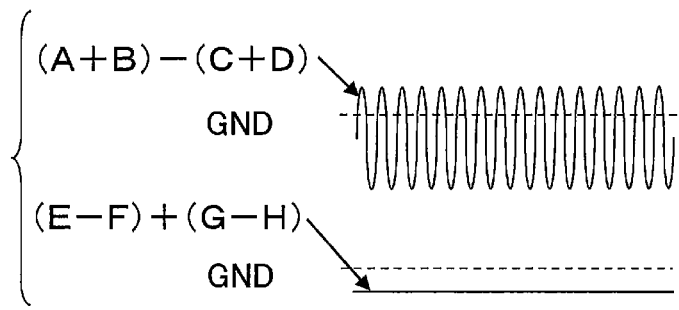

FIGS. 6A to 6C are diagrams illustrating changes in the detection signals from the light receiving surfaces of the photodetector 109, as a result of the shifts of the objective lens 105 in the radial direction. These signals are in a state that a focus servo control is on and a track servo control is off.

As illustrated in FIG. 6A, when the objective lens 105 is not shifted in the radial direction, a signal (A+B)−(C+D) has a push-pull waveform without an offset. At the time, a signal (E−F)+(G−H) also has a DC waveform without an offset.

As illustrated in FIG. 6B, when the objective lens 105 is shifted in the internal circumferential direction, the signal (A+B)−(C+D) has a push-pull waveform with a positive offset. At the time, the signal (E−F)+(G−H) also has a DC waveform with a positive offset. Thus, a value of the signal (E−F)+(G−H) indicates a value corresponding to a shift amount of the objective lens, and the tracking error signal TES from which the offset is canceled is obtained by subtracting constant times (k times) of the value of (E−F)+(G−H) from a value of (A+B)−(C+D).

As illustrated in FIG. 6C, when the objective lens 105 is shifted in the external circumferential direction, the signal (A+B)−(C+D) has a push-pull waveform with a negative offset. At the time, the signal (E−F)+(G−H) also has a DC waveform with a negative offset. Thus, a value of the signal (E−F)+(G−H) indicates a value corresponding to the shift amount of the objective lens, and the tracking error signal TES from which the offset is canceled is obtained by subtracting constant times of the value of (E−F)+(G−H) from a value of (A+B)−(C+D).

As a substitute for the constant times of the value of the signal (E−F)+(G−H), constant times of a value of a signal (E−F) or constant times of a value of a signal (G−H) can be used.

As described above, according to the optical head device or the optical disc apparatus of the first embodiment, an offset in the tracking error signal TES can be canceled by using the eight-divided photodetector for tracking error detection according to a typical differential method.

Second Embodiment

Figure 7:
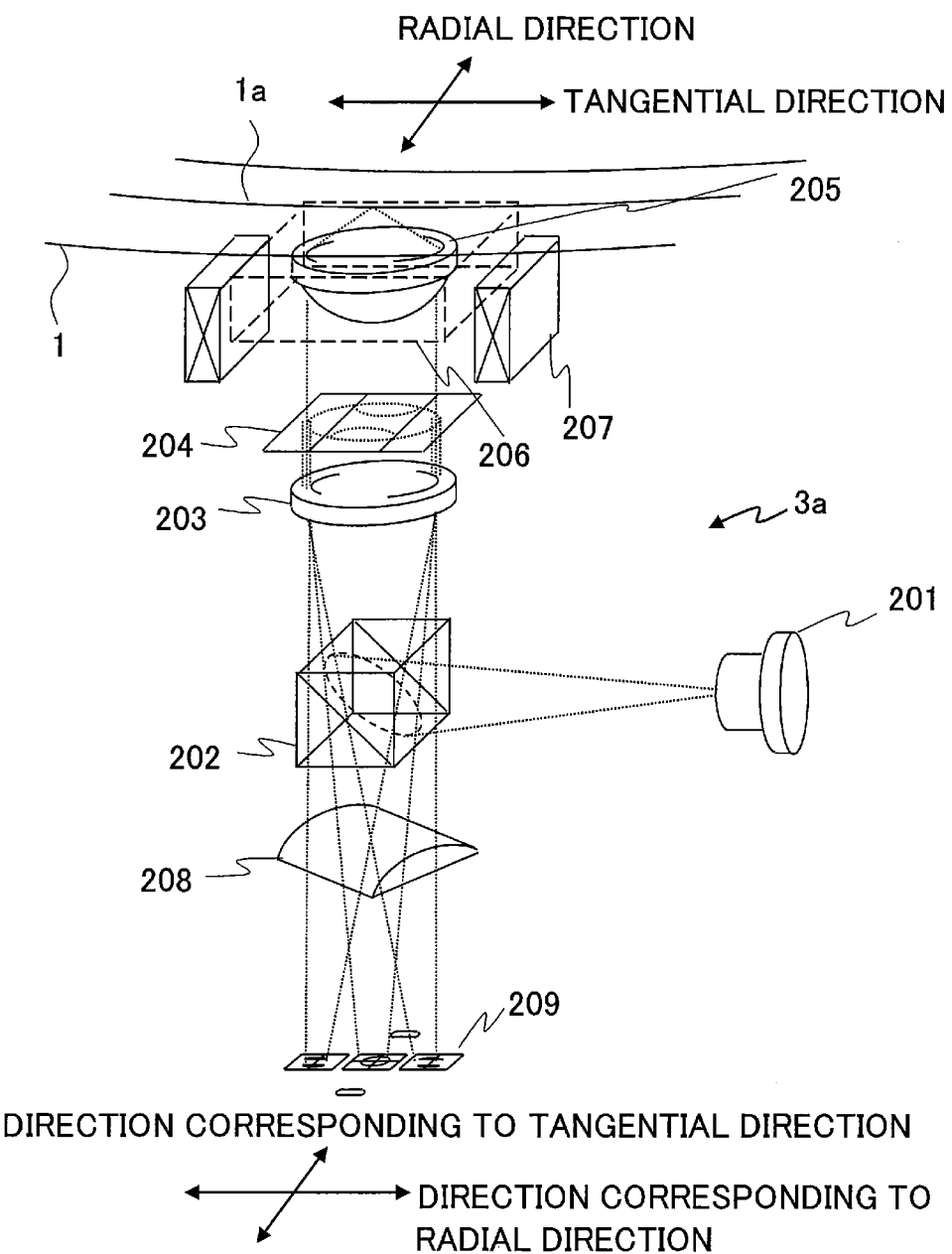
FIG. 7 is a perspective view schematically illustrating a structure of an optical head device according to the second embodiment.

FIG. 7 is a perspective view schematically illustrating a structure of an optical head device 3a according to a second embodiment of the present invention. In FIG. 7, the optical head device 3a has a semiconductor laser 201; a polarizing beam splitter 202; a collimator lens 203; a polarizing hologram 204 which is a diffraction element fixed to the optical head device 3a; a ¼ wavelength plate (not illustrated in the drawing); an objective lens 205; a movable holder unit 206 which holds the objective lens 205; an objective lens actuator 207 which drives the movable holder unit 206 in a focus direction or a radial direction on an optical disc 1; a cylindrical lens 208 which is an optical element for providing astigmatism; and a photodetector 209. The semiconductor laser 201, the polarizing beam splitter 202, the collimator lens 203, the ¼ wavelength plate (not illustrated in the drawing), the objective lens 205, the cylindrical lens 208 and the photodetector 209 are substantially the same as the semiconductor laser 101, the polarizing beam splitter 102, the collimator lens 103, the ¼ wavelength plate (not illustrated in the drawing), the objective lens 105, the cylindrical lens 108 and the photodetector 109 in the first embodiment. The optical head device 3a according to the second embodiment differs from the optical head device 3 according to the first embodiment in only the following points that: the movable holder unit 206 holds the objective lens 205 and does not hold the polarizing hologram 204; and polarization areas of the polarizing hologram 204 have different shapes. For this reason, the second embodiment will be explained by also referring to FIG. 1 and FIGS. 6A to 6C.

FIG. 8 is a plan view illustrating the polarizing hologram 204 in FIG. 7. As illustrated in FIG. 8, the polarizing hologram 204 has a first diffraction area 213 including a whole of areas 222 and 223 which are irradiated with overlap of a zeroth-order beam of reflection light diffracted by an information track 1a on the optical disc 1 and positive/negative first-order beams of the reflection light (two areas each surrounded by two arcs in dotted lines in FIG. 8). The polarizing hologram 204 has second diffraction areas 211 and 212 each including an area 221 which is irradiated with the zeroth-order beam of the reflection light and not irradiated with the positive/negative first-order beams of the reflection light, and without including the first diffraction area 213.

As illustrated in FIG. 8, in the second embodiment, the first diffraction area 213 has a shape (a rectangle illustrated as a vertically-hatched area in FIG. 8) that each of the two areas 222 and 223 is enlarged in the radial direction (a horizontal direction in FIG. 8), the two areas 222 and 223 which are areas irradiated with overlap of the zeroth-order beam of the reflection light and the positive/negative first-order beams of the reflection light on the polarizing hologram 204.

As illustrated in FIG. 8, in the second embodiment, the second diffraction areas 211 and 212 are areas irradiated with the zeroth-order beam of the reflection light and not irradiated with the positive/negative first-order beams of the reflection light on the polarizing hologram 204. The second diffraction areas 211 and 212 are on outer sides of the first diffraction area 213 in a tangential direction on the optical disc 1 (two rectangular areas illustrated as two horizontally-hatched areas in FIG. 8).

The diffraction area 213 has a shape that the areas 222 and 223 are within the diffraction area 213, even if the objective lens 205 shifts in the radial direction which is perpendicular to the information track 1a. The polarizing hologram 204 causes diffraction on only the returning laser light reflected by the optical disc 1 and splits the laser light into seven laser beams of the zeroth-order beam and the positive/negative first-order beams, on the basis of that laser light has various polarization directions. A diffraction light amount ratio is as follows: positive first-order beam:zeroth-order beam:negative first-order beam=1:1:1.

FIG. 9 is a drawing illustrating light receiving surfaces of the photodetector 209 in FIG. 7 and areas irradiated with the laser light which is split into the seven beams by the polarizing hologram 204. The photodetector 209 has a first light receiving section 231 which includes a plurality of light receiving surfaces for receiving a first light beam 241 which is a zeroth-order beam of diffraction light generated by the first diffraction area 213 and the second diffraction areas 211 and 212 of the polarizing hologram 204 (i.e., a zeroth-order beam generated as a result of the diffraction (transmission) of the reflection light from the optical disc 1 by the polarizing hologram 204), and the plurality of light receiving surfaces are adjacently arranged at least in a direction corresponding to the radial direction. The photodetector 209 has a second light receiving section 232 which includes a plurality of light receiving surfaces for receiving two second light beams 242 and 243 which are positive first-order beams of diffraction light generated by the second diffraction areas 211 and 212 of the polarizing hologram 204, and the plurality of light receiving surfaces are adjacently arranged in the direction corresponding to the radial direction. The photodetector 209 has a third light receiving section 233 which includes a plurality of light receiving surfaces for receiving third light beams 244 and 245 which are negative first-order beams of the diffraction light generated by the second diffraction areas 211 and 212, and the plurality of light receiving surfaces are adjacently arranged in the direction corresponding to the radial direction. In the second embodiment, the light receiving surfaces of the photodetector 209 form an eight-divided photodetector for tracking error detection according to a differential method which is typical as a tracking error signal generating method for optical disc apparatuses. The photodetector 209 has the eight light receiving surfaces: four light receiving surfaces A, B, C and D forming the first light receiving section 231; two light receiving surfaces E and F forming the second light receiving section 232; and two light receiving surfaces G and H forming the third light receiving section 233. The light receiving surfaces have same shapes as those in the first embodiment.

The first light beam 241 which is the zeroth-order beam of the diffraction light generated by the polarizing hologram 204 (passing through the polarizing hologram 204) reaches the light receiving surfaces A, B, C and D of the first light receiving section 231. The positive first-order beams of the diffraction light generated by the second diffraction areas 211 and 212 of the polarizing hologram 204 reach the light receiving surfaces E and F of the second light receiving section 232, as the second light beams 242 and 243. The negative first-order beams of the diffraction light generated by the diffraction areas 211 and 212 of the polarizing hologram 204 reach the light receiving surfaces G and H of the third light receiving section 233, as the third light beams 244 and 245. The positive/negative first-order beams diffracted by the first diffraction area 213 of the polarizing hologram 204 reach outside the light receiving surfaces of the photodetector 209, as light beams 246 and 247. In the following explanation, levels of electric signals which are photo-electrically converted by the light receiving surfaces A, B, C, D, E, F, G and H are denoted by A, B, C, D, E, F, G and H, respectively.

The matrix circuit 5 receives detection signals A, B, C, D, E, F, G and H from the photodetector 209, and produces a focus error signal FES according to an astigmatic operation of the following equation:

FES=(A+C)−(B+D)

The matrix circuit 5 produces a tracking error signal TES according to an operation of the following equation:

TES=(A+B)−(D+C)−k×{(E−F)+(G−H)} where k is a constant.

Figure 10A:
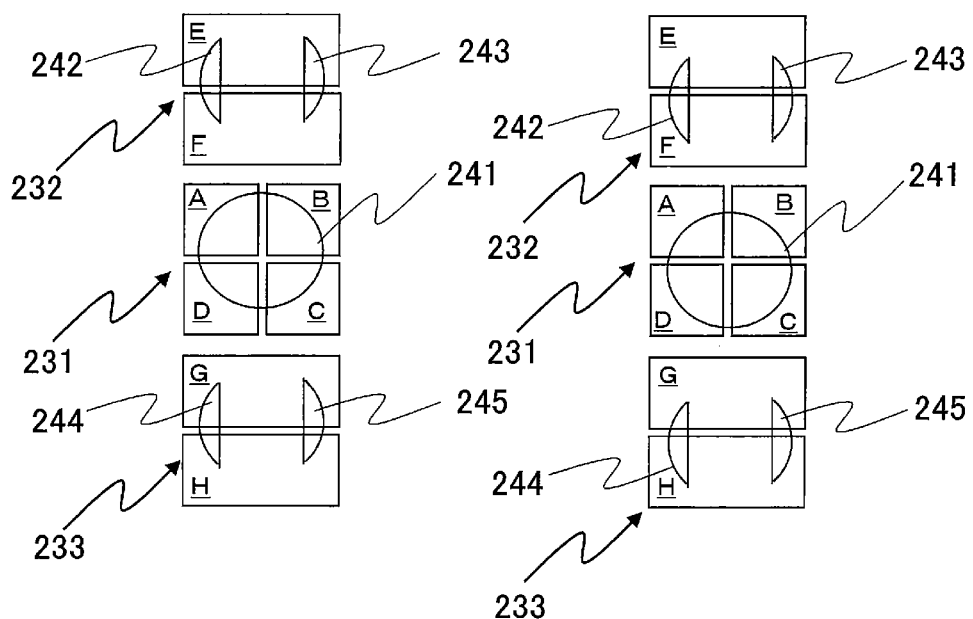
FIGS. 10A and 10B are diagrams illustrating shifted irradiation positions irradiated with the light beams on the light receiving surface of the photodetector, as a result of shifts of an objective lens in a radial direction.
Figure 10B:
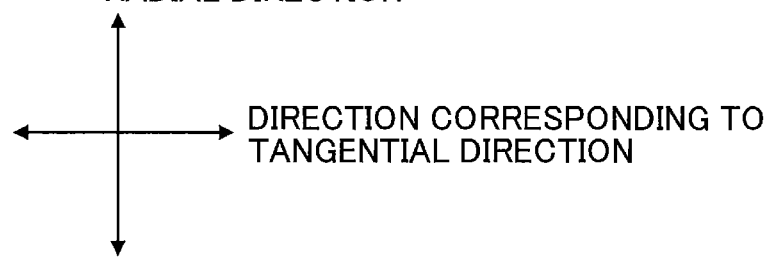

FIGS. 10A and 10B are diagrams illustrating shifted irradiation positions irradiated with the light beams on the light receiving surfaces of the photodetector 209, as a result of shifts of the objective lens 205 in the radial direction. FIG. 10A illustrates that the light beams 241 to 245 shift toward an upper part of FIG. 10A, when the objective lens 205 shifts in an internal circumferential direction of the optical disc 1. FIG. 10B illustrates that the light beams 241 to 245 shift toward a lower part of FIG. 10B, when the objective lens 205 shifts in an external circumferential direction of the optical disc 1.

In the second embodiment, as well as in the first embodiment, as illustrated in FIGS. 6A to 6C, shifts in a waveform of a signal (A+B)−(C+D) and offsets in a DC waveform of a signal (E−F)+(G−H) occur, when the objective lens 205 shifts in the radial direction on the optical disc 1. Thus, a value of the signal (E−F)+(G−H) indicates a value corresponding to a shift amount of the objective lens, and the tracking error signal TES from which offset is canceled is obtained by subtracting constant times (k times) of the value of (E−F)+(G−H) from a value of (A+B)−(C+D).

As a substitute for the constant times of the value of the signal (E−F)+(G−H), constant times of a value of a signal (E−F) or constant times of a value of a signal (G−H) can be used.

As described above, according to the optical head device or the optical disc apparatus of the second embodiment, even if the objective lens 205 and the polarizing hologram 204 do not shift as a single body, an offset in the tracking error signal TES can be canceled by using the eight-divided photodetector for tracking error detection according to a typical differential method.

Third Embodiment

FIG. 11 is a perspective view schematically illustrating a structure of an optical head device 3b according to a third embodiment of the present invention. In FIG. 11, the optical head device 3b has a semiconductor laser 301; a plate type polarizing beam splitter 302 which functions as a reflecting surface in a going path and provides astigmatism in a returning path; a collimator lens 303; a ¼ wavelength plate 304; an objective lens 305; a movable holder unit 306 which holds the objective lens 305; an objective lens actuator 307 which drives the movable holder unit 306 in a focus direction or a radial direction of an optical disc 1; a hologram 308 which is a non-polarizing diffraction element; and a photodetector 309. The semiconductor laser 301, the collimator lens 303, the objective lens 305 and the photodetector 309 are substantially the same as the semiconductor laser 201, the collimator lens 203, the objective lens 205 and the photodetector 209 in the second embodiment. The optical head device 3b according to the third embodiment differs from the optical head device 3a according to the second embodiment in the following points that: the plate type polarizing beam splitter 302 is used and the cylindrical lens 208 (FIG. 2) is not used; and the hologram 308 is disposed just before the optical detector 309. The third embodiment will be explained by also referring to FIG. 1 and FIGS. 6A to 6C.

FIG. 12 is a plan view illustrating the hologram 308 in FIG. 11. As illustrated in FIG. 12, the hologram 308 has a first diffraction area 313 including a whole of areas 322 and 323 which are irradiated with overlap of a zeroth-order beam of reflection light diffracted by an information track 1a on the optical disc 1 and positive/negative first-order beams of the reflection light (two areas each surrounded by two arcs in dotted lines in FIG. 12). The hologram 308 has second diffraction areas 311 and 312 each including an area 321 which is irradiated with the zeroth-order beam of the reflection light and not irradiated with the positive/negative first-order beams of the reflection light, and without including the first diffraction area 313.

As illustrated in FIG. 12, in the third embodiment, the first diffraction area 313 has a shape (a rectangle illustrated as a vertically-hatched area in FIG. 12) that each of the two areas 322 and 323 is enlarged in the radial direction (a horizontal direction in FIG. 12), the two areas 322 and 323 which are areas on the hologram 308 irradiated with the zeroth-order beam of the reflection light and the positive/negative first-order beams of the reflection light.

As illustrated in FIG. 12, in the third embodiment, the second diffraction areas 311 and 312 are areas irradiated with the zeroth-order beam of the reflection light and not irradiated with the positive/negative first-order beams of the reflection light on the hologram 308. The second diffraction areas 311 and 312 are on outer sides of the first diffraction area 313 in a tangential direction of the optical disc 1 (two rectangular areas illustrated as two horizontally-hatched areas in FIG. 12).

The diffraction area 313 has a shape that the areas 322 and 323 are within the diffraction area 313, even if the objective lens 305 shifts in the radial direction which is perpendicular to the information track 1a. The hologram 308 splits laser light into seven laser beams of the zeroth-order beam and the positive/negative first-order beams. A diffraction light amount ratio is as follows:
positive first-order beam:zeroth-order beam:negative first-order beam=1:1:1.

Figure 13:
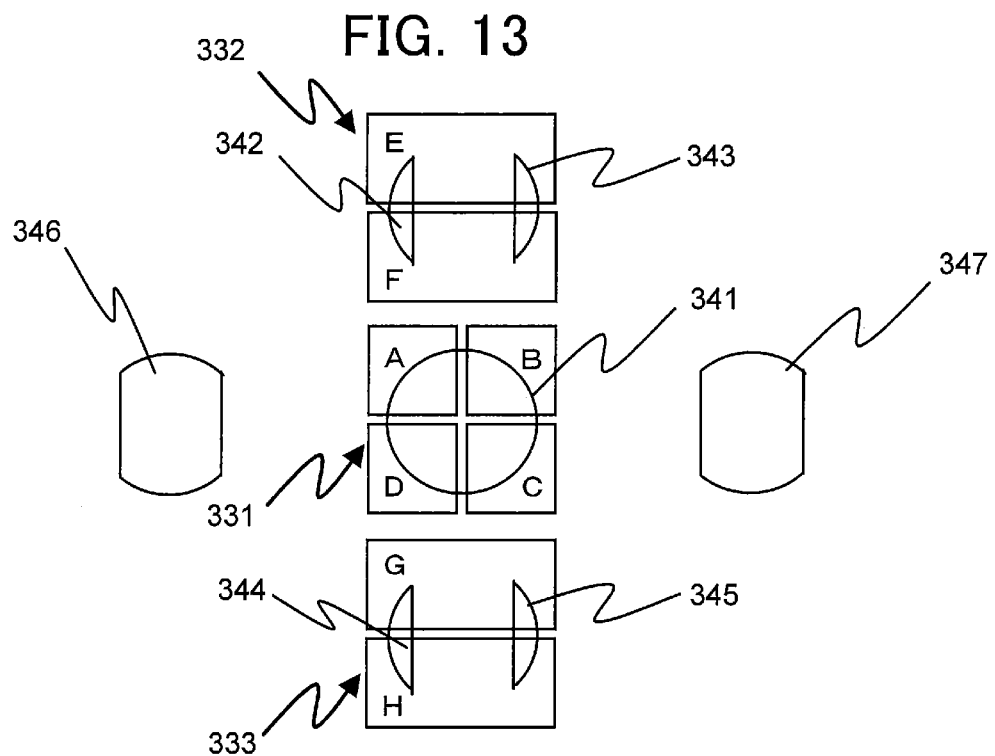
FIG. 13 is a diagram illustrating light receiving surfaces of a photodetector in FIG. 11 and areas irradiated with seven light beams which are divided by the hologram.

FIG. 13 is a diagram illustrating light receiving surfaces of the photodetector 309 in FIG. 11 and areas irradiated with the laser light which is split into the seven beams by the hologram 308. The photodetector 309 has a first light receiving section 331 which includes a plurality of light receiving surfaces for receiving a first light beam 341 which is a zeroth-order beam of diffraction light generated by the first diffraction area 313 and the second diffraction areas 311 and 312 of the hologram 308 (i.e., a zeroth-order beam generated as a result of the diffraction (transmission) of the reflection light from the optical disc 1 by the hologram 308), and the plurality of light receiving surfaces are adjacently arranged at least in a direction corresponding to the radial direction. The photodetector 309 has a second light receiving section 332 which include a plurality of light receiving surfaces for receiving two second light beams 342 and 343 which are positive first-order beams of diffraction light generated by the second diffraction areas 311 and 312 of the hologram 308, and the plurality of light receiving surfaces are adjacently arranged in the direction corresponding to the radial direction. The photodetector 309 has a third light receiving section 333 which includes a plurality of light receiving surfaces for receiving third light beams 344 and 345 which are negative first-order beams of the diffraction light generated by the second diffraction areas 311 and 312, and the plurality of light receiving surfaces are adjacently arranged in the direction corresponding to the radial direction. In the third embodiment, the light receiving surfaces of the photodetector 309 form an eight-divided photodetector for tracking error detection according to a differential method which is typical as a tracking error signal generating method for optical disc apparatuses. The photodetector 309 has the eight light receiving surfaces: four light receiving surfaces A, B, C and D forming the first light receiving section 331; two light receiving surfaces E and F forming the second light receiving section 332; and two light receiving surfaces G and H forming the third light receiving section 333. The light receiving surfaces have same shapes as those in the second embodiment.

The first light beam 341 which is the zeroth-order beam of the diffraction light generated by the hologram 308 (passing through the hologram 308) reaches the light receiving surfaces A, B, C and D of the first light receiving section 331. The positive first-order beams of the diffraction light generated by the second diffraction areas 311 and 312 of the hologram 308 reach the light receiving surfaces E and F of the second light receiving section 332, as the second light beams 342 and 343. The negative first-order beams of the diffraction light generated by the diffraction areas 311 and 312 of the hologram 308 reach the light receiving surfaces G and H of the third light receiving section 333, as the third light beams 344 and 345. The positive/negative first-order beams diffracted by the first diffraction area 313 of the hologram 308 reach outside the light receiving surfaces of the photodetector 309, as light beams 346 and 347. In the following explanation, levels of electric signals which are photo-electrically converted by the light receiving surfaces A, B, C, D, E, F, G and H are denoted by A, B, C, D, E, F, G and H, respectively.

The matrix circuit 5 (FIG. 1) receives detection signals A, B, C, D, E, F, G and H from the photodetector 309 and produces a focus error signal FES according to an astigmatic operation of the following equation:

$$FES=(A+C)-(B+D)$$

The matrix circuit 5 produces a tracking error signal TES according to an operation of the following equation:

$$TES=(A+B)-(D+C)-k \times \{(E-F)+(G-H)\}$$

where k is a constant.

FIGS. 14A and 14B are diagrams illustrating shifted irradiation positions irradiated with the light beams on the light receiving surfaces of the photodetector 309, as a result of shifts of the objective lens 305 in the radial direction. FIG. 14A illustrates that the light beams 341 to 345 shift toward an upper part of FIG. 14A, when the objective lens 305 shifts in an internal circumferential direction of the optical disc 1. FIG. 14B illustrates that the light beams 341 to 345 shift toward a lower part of FIG. 14B, when the objective lens 305 shifts in an external circumferential direction of the optical disc 1.

In the third embodiment, as well as in the first embodiment, as illustrated in FIGS. 6A to 6C, shifts in a waveform of a signal (A+B)−(C+D) and offsets in a DC waveform of a signal (E−F)+(G−H) occur, when the objective lens 305 shifts in the radial direction of the optical disc 1. Thus, a value of the signal (E−F)+(G−H) indicates a value corresponding to a shift amount of the objective lens, and the tracking error signal TES from which the offset is canceled is obtained by subtracting constant times (k times) of the value of (E−F)+(G−H) from a value of (A+B)−(C+D).

As a substitute for the constant times of the value of the signal (E−F)+(G−H), constant times of a value of a signal (E−F) or constant times of a value of a signal (G−H) can be used.

As described above, according to the optical head device or the optical disc apparatus of the third embodiment, even if the plate type polarizing beam splitter 302 is used, the cylindrical lens 208 (FIG. 7) is not used, and the hologram 308 is disposed just before the photodetector 309, an offset in the tracking error signal TES can be canceled by using the eight-divided photodetector for tracking error detection according to a typical differential method.

If the amount of light emitted from the objective lens 305 is enough to record or playback, the plate type polarizing beam splitter 302 may not be a polarizer.

As to the diffraction area 313 of the hologram 308, when the objective lens 305 shifts in the radial direction which is perpendicular to the information track 1a, a boundary line between the diffraction area 313 and the diffraction area 311 and a boundary line between the diffraction area 313 and the diffraction area 312 may not be straight lines, as long as the areas 322 and 323 are within the diffraction area 313. FIG. 15 is a plan view illustrating another example of the hologram 308 in FIG. 11. In FIG. 15, elements which correspond to those in FIG. 12 are denoted by the same numerals. As illustrated in FIG. 15, the hologram 308 has the second diffraction areas 311 and 312 which are pentagons in order to make the second diffraction areas 311 and 312 larger than those in FIG. 12. In this case, the amount of light received by the photodetectors E, F, G and H can be increased.

The diffraction light amount ratio when the hologram 308 splits the laser light into the seven laser beams of the zeroth-order beam and the positive/negative first-order beams is not limited to the ratio:

positive first-order beam:zeroth-order beam:negative first-order beam=1:1:1.

It is efficient that the diffraction light amount ratio is set so as to satisfy the following relationship:

$$E+F>10\times(Es+Fs) \text{ and } G+H>10\times(Gs+Hs)$$

where stray light components of the detection signals E, F, G and H which are received as stray light from neighboring layers, in a case of a multilayered disc, by the photodetectors E, F, G and H are Es, Fs, Gs and Hs, respectively.

Fourth Embodiment

Figure 16:
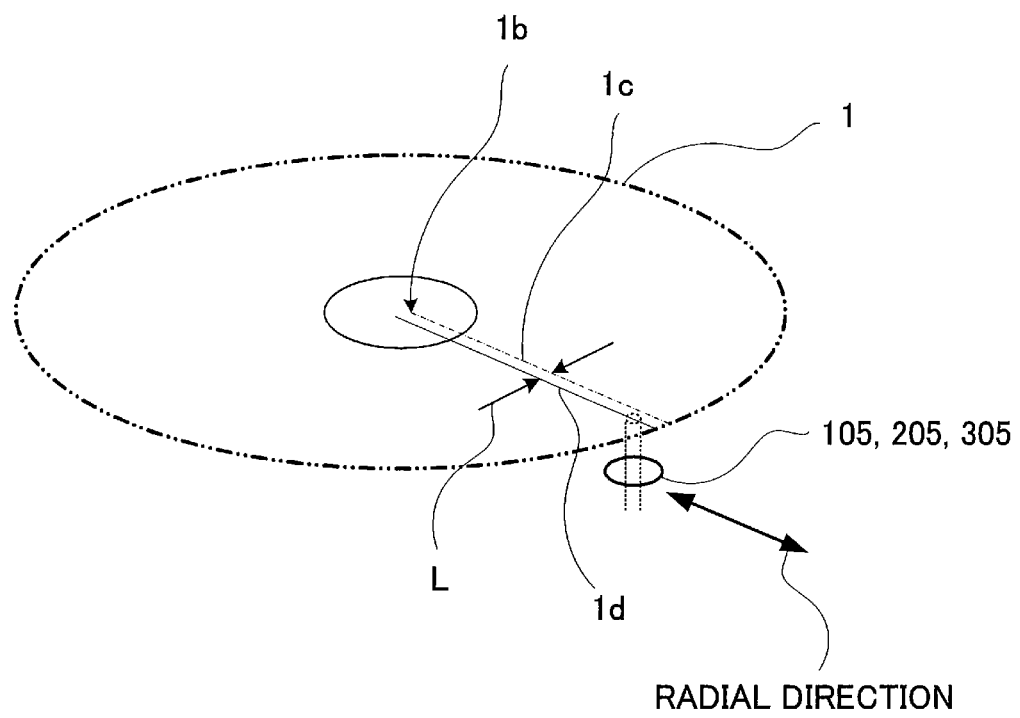
FIG. 16 is a perspective view schematically illustrating a structure in a fourth embodiment which is another example of the positions of the objective lenses in the first, second and third embodiments.

FIG. 16 is a perspective view schematically illustrating a structure in a fourth embodiment which is another example of the positions of the objective lenses 105, 205 and 305 in the first, second and third embodiments. As illustrated in FIG. 16, because a tracking error signal is obtained with a single beam in the first, second and third embodiments, the objective lenses 105, 205 and 305 can face the disc 1 on a line (an objective-lens movement line) 1*d* which is off-centered (deviated) at a distance L from a disc radial line 1*c* passing through a center 1*b* of the optical disc 1. Therefore, in a case that an optical head device which can read out from discs of a plurality of different standards (e.g., CDs, DVDs, discs for blue laser light and the like) has a plurality of objective lenses, the objective lenses 105, 205 and 305 can be disposed in off-center positions (on the objective-lens movement line 1*d*) and another objective lens corresponding to another standard can be disposed on the disc radial line 1*c*.

EXPLANATION OF REFERENCE NUMERALS AND SYMBOLS

1 optical disc; 1*a* information track; 1*b* center of disc; 1*c* disc radial line; 1*d* objective lens movement line; spindle motor; 3 optical head device; 4 shifting means; 5 matrix circuit; 6 signal reproducing circuit; 7 servo circuit; 8 spindle controlling circuit; 9 laser controlling circuit; 10 thread controlling circuit; 11 controller; 101, 201, 301 semiconductor laser; 102, 202 polarizing beam splitter; 103, 203, 303 collimator lens; 104, 204, 308 polarizing hologram; 105, 205, 305 objective lens; 106, 206, 306 movable holder unit; 107, 207, 307 objective lens actuator; 108, 208 cylindrical lens; 109, 209, 309 photodetector; 110 effective circle of polarizing hologram; 111 second diffraction area of polarizing hologram; 112, 113, 313 first diffraction area of polarizing hologram; 121, 221, 321 area where zeroth-order beam of reflection light passes and positive/negative first-order beams of reflection light do not pass; 122, 123, 222, 223, 322, 323 area where zeroth-order beam of reflection light and positive/negative first-order beams of reflection light pass; 131, 231, 331 first light receiving section of photodetector; 132, 232, 332 second light receiving section of photodetector; 133, 233, 333 third light receiving section of photodetector; 141, 241, 341 zeroth-order beam of diffraction light by polarizing hologram; 142, 242, 243, 342, 343 positive first-order beam of diffraction light from second diffraction area of polarizing hologram; 143, 244, 245, 344, 345 negative first-order beam of diffraction light from second diffraction area of polarizing hologram; 144 to 147, 246, 247, 346, 347 diffraction light from first diffraction area of polarizing hologram; 302 plate type polarizing beam splitter.

What is claimed is:

1. An optical head device comprising:
   a laser light source for emitting laser light;
   an objective lens for collecting the laser light which travels toward an optical disc and collecting reflection light which has been diffracted by an information track on the optical disc;
   a diffraction element for diffracting the reflection light which is collected by the objective lens;
   an optical element for providing the reflection light with astigmatism;
   a photodetector for receiving the reflection light; and
   an objective lens actuator for receiving a drive signal from an external device and shifting the objective lens, in an amount corresponding to a value of the drive signal, at least in a radial direction of the optical disc;
   wherein the diffraction element includes:
   a first diffraction area including a whole of an area which is irradiated with overlap of a zeroth-order beam of the reflection light and positive/negative first-order beams of the reflection light; and
   a second diffraction area including an area which is irradiated with the zeroth-order beam of the reflection light and not irradiated with the positive/negative first-order beams of the reflection light and without including the first diffraction area;
   wherein the photodetector includes:
   a first light receiving section including a plurality of light receiving surfaces for receiving a first light beam which is the zeroth-order beam of the diffraction light generated by the first diffraction area and the second diffraction area, the plurality of light receiving surfaces being adjacently arranged at least in the direction corresponding to the radial direction; and
   at least one of a second light receiving section and a third light receiving section, the second light receiving section including a plurality of light receiving surfaces for receiving a second light beam which is a positive first-order beam of the diffraction light generated by the second diffraction area and the plurality of light receiving surfaces being adjacently arranged in the direction corresponding to the radial direction, the third light receiving section including a plurality of light receiving surfaces for receiving a third light beam which is a negative first-order beam of the diffraction light generated by the second diffraction area and the plurality of light receiving surfaces being adjacently arranged in the direction corresponding to the radial direction.

2. The optical head device according to claim 1, further comprising a holder unit for holding the objective lens and the diffraction element as a single body,
   wherein the shift of the objective lens by the objective lens actuator is performed by a shift of the holder unit.

3. The optical head device according to claim 2,
   wherein the first diffraction area has a same shape as the two areas which are irradiated with overlap of the zeroth-order beam of the reflection light and the positive/negative first-order beams of the reflection light on the diffraction element, and
   the second diffraction area has a same shape as the area which is irradiated with the zeroth-order beam of the reflection light and not irradiated with the positive/negative first-order beams of the reflection light on the diffraction element.

4. The optical head device according to claim 1, further comprising a holder unit which holds the objective lens and does not hold the diffraction element, wherein the shift of the objective lens by the objective lens actuator is performed by a shift of the holder unit.

5. The optical head device according to claim 4, wherein the first diffraction area is an area having a shape obtained by enlarging each of the two areas in the radial direction, each of the two areas being irradiated on the diffraction element with overlap of the zeroth-order beam of the reflection light and the positive/negative first-order beams of the reflection light in the radial direction.

6. The optical head device according to claim 4, wherein the second diffraction area is an area irradiated with the zeroth-order beam of the reflection light and not irradiated with the positive/negative first-order beams of the reflection light on the diffraction element, and the second diffraction area is located on an outer side of the first diffraction area in a tangential direction on the optical disc.

7. The optical head device according to claim 1, wherein the objective lens is off-centered from a disc radial line of the optical disc.

8. The optical head device according to claim 1, wherein:
the plurality of light receiving surfaces of the second light receiving section of the photodetector are two light receiving surfaces which are adjacently arranged in the direction corresponding to the radial direction, and
the plurality of light receiving surfaces of the third light receiving section of the photodetector are two light receiving surfaces which are adjacently arranged in the direction corresponding to the radial direction.

9. The optical head device according to claim 8, wherein:
a boundary line between the two light receiving surfaces of the second light receiving section of the photodetector is a straight line extending in a direction corresponding to the tangential direction, and
a boundary line between the two light receiving surfaces of the third light receiving section of the photodetector is a straight line extending in the direction corresponding to the tangential direction.

10. The optical head device according to claim 1, wherein the plurality of light receiving surfaces of the first light receiving section of the photodetector are four light receiving surfaces which are adjacently arranged in the direction corresponding to the radial direction and in the direction corresponding to the tangential direction on the optical disc.

11. An optical disc apparatus comprising:
a disc driving unit for rotating an optical disc;
the optical head device of claim 1 for reading information from the optical disc or writing information on the optical disc while the optical disc is rotating; and
a servo circuit for receiving detection signals from the plurality of fight receiving surfaces of the first light receiving section, and at least one of detection signals from the plurality of light receiving surfaces of the second light receiving section and detection signals from the plurality of light receiving surfaces of the third light receiving section, the servo circuit producing a tracking error signal by subtracting, from a difference among the detection signals from the plurality of light receiving surfaces of the first light receiving section, a value of constant times of a signal which is determined from at least one of a difference among the detection signals from the plurality of light receiving surfaces of the second light receiving section and a difference among the detection signals from the plurality of light receiving surfaces of the third light receiving section, the servo circuit outputting the tracking error signal as the drive signal to the objective lens actuator.

* * * * *